(12) United States Patent
Holm

(10) Patent No.: US 7,672,684 B2
(45) Date of Patent: Mar. 2, 2010

(54) ANSWER MODES IN PUSH-TO-TALK MOBILE COMMUNICATION SERVICES

(75) Inventor: Jan Holm, Örbyhus (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 557 days.

(21) Appl. No.: 10/574,461

(22) PCT Filed: Apr. 4, 2005

(86) PCT No.: PCT/EP2005/051501

§ 371 (c)(1),
(2), (4) Date: Mar. 31, 2006

(87) PCT Pub. No.: WO2006/105813

PCT Pub. Date: Oct. 12, 2006

(65) Prior Publication Data

US 2008/0248826 A1   Oct. 9, 2008

(51) Int. Cl.
H04B 7/00 (2006.01)
(52) U.S. Cl. ..................... 455/518; 455/567
(58) Field of Classification Search ........... 370/432, 370/426; 455/553.1
See application file for complete search history.

(56) References Cited

U.S. PATENT DOCUMENTS 7,444,160 B1 * 10/2008 Fournier et al. ............ 455/518
2002/0085698 A1    7/2002 Liebenow
2004/0057449 A1 *  3/2004 Black ........................ 370/432
2005/0259675 A1 * 11/2005 Tuohino et al. ............ 370/426
2006/0223568 A1 * 10/2006 Harris et al. ............. 455/550.1

OTHER PUBLICATIONS

A. Allen, J. Holm, T Hallin: "Private Header Extension to the Session Initiation Protocol for the Open Mobile Alliance Push to Talk over Cellular" 'Online! Nov. 21, 2004, XP002354547, Retrieve from the Internet: URL:http://ietf.mirror.netmonic.com/draft-allen-sipping-poc-p-headers-00.txt>.
Open Mobile Alliance: "Push to talk over Cellular (PoC)—Architecture, Candidate Version 1.0" OMA, Mar. 17, 2005, XP002344470 cited in the application.

* cited by examiner

Primary Examiner—Tu X Nguyen

(57) ABSTRACT

A method of operating a push-to-talk service over a mobile wireless communication network, where a user of a mobile wireless terminal may select an automatic or manual answer mode for incoming session invitations for at least some other users. The method comprises including in the push-to-talk session invitation sent from a calling party to a called party, a manual answer mode request, upon receipt of the session invitation at a push-to-talk server serving the called party, forwarding the invitation including the manual answer mode request to the called party regardless of any auto-answer mode setting for the called party, and receiving the invitation at the called party, and generating a ringing alert at the called party's terminal.

13 Claims, 3 Drawing Sheets

ANSWER MODES IN PUSH-TO-TALK MOBILE COMMUNICATION SERVICES

FIELD OF THE INVENTION

The present invention relates to the answer modes available in push-to-talk mobile communication services.

BACKGROUND TO THE INVENTION

The Industry group know as the Open Mobile Alliance has developed a Push to talk Over Cellular (PoC) specification aimed at enabling the provision of services over standard mobile wireless communication networks which resemble walkie-talkie services, i.e. at the push of a button a subscriber can be instantly connected to one or more other subscribers. PoC is currently defined in the documents published by the Open Mobile Alliance: "Push to talk over Cellular (PoC)—Architecture", Candidate Version 1.0—17, Mar. 2005, and "OMA PoC Control Plane", Candidate Version 1.0—17, Mar. 2005. According to the PoC standards, voice data comprises talk "bursts" carried over a packet network, whilst the signalling used to establish and control PoC sessions comprises Session Initiation Protocol (SIP) signalling, also carried over the packet network. PoC relies upon the IP Multimedia Subsystem (IMS) infrastructure provided within the networks of mobile operators. PoC is a specific implementation of the general push-to-talk (PTT) services.

FIG. 1 illustrates in very basic terms the PoC infrastructure which facilitates a PoC session between a pair of wireless terminals (SIP clients) identified as UE-A and UE-B. The UEs are attached to respective radio access networks (RAN-A and RAN-B), which in turn are connected to a packet-switched core network including an IP backbone. SIP signalling is routed through the IMS which includes SIP application servers acting as PoC servers. The UEs are registered with respective PoC servers (although it is possible that both UEs are registered with the same PoC server).

The basic concept underlying PoC is the desire to allow one user to be almost instantaneously connected to another user, so that a user just has to press a call button and begin talking, with his or her voice being played out immediately on the other user's terminal. However, it was appreciated at a very early stage in the development of push-to-talk services that this may not always be desireable, at least from the point of view of the called party. Provision was therefore made for the playing of a ringing alert at the called terminal, in much the same way as is provided for with conventional telephone calls (push-to-talk services would still establish the session extremely quickly, much more quickly than conventional telephone calls can be established), with users being given the option to select either the auto-answer mode or the manual (ringing) answer mode.

According to the latest versions of the PoC standards, it is possible for a user (UserB) to register with his local PoC server, a "white" list of other user identities (UserA) for which the user wishes to apply the auto-answer mode. In the event that a PoC session is requested by one of the users on the white list, this is recognised by UserB's local PoC server, and that PoC server includes an auto-answer flag in the SIP INVITE message that is forwarded to UserB. UserB's terminal detects the flag, and automatically returns the SIP 200OK (answer) message. The session is established. If the calling user is not on the white list (or no white list has been defined), a manual flag is included in the SIP INVITE forwarded to UserB's terminal. This is detected by the terminal, and a ringing alert played. The SIP 200OK is not sent by the terminal to its local PoC server until the user answers. IETF draft "A Session Initiation Protocol (SIP) Event Package and Data Format for various settings in support for the Push-to-talk Over Cellular (PoC) service", Miguel-Angel Garcia-Martin, draft-garcia-sipping-poc-isb-am-01, describes a method for notifying the local PoC server of the answer mode applicable to users on the white list. A user switches between the manual and auto-answer modes by signalling the desired mode to the PoC server using the SIP PUBLISH message as defined in the PoC standards.

This signalling process, including auto-answer mode setting and session establishment, is illustrated in FIG. 2. Signalling flows in the user plane (e.g. the exchange of Talk Burst Control Protocol messages) is not shown in the Figure. The steps illustrated in the Figure are as follows:

1. The PoC Client B configures automatic mode in the network by means of a PUBLISH request.
2. The PoC Server B acknowledges the automatic answer mode setting by means of a 200 "OK" response and stores the 'auto' setting.

When the PoC User A presses the PoC button, the steps are as follows:

3. The PoC Client A decides to invite PoC User B to a PoC Session and sends an INVITE request to the PoC Server A.
4. The PoC Server A sends the INVITE request to the PoC Server B in the PoC User B Home Network.
5. The PoC Server B authorizes the PoC User A and selects the configured answer mode and sends a 183 "Session progress" response to the PoC Server A.
6. The PoC Server A sends a 200 OK response to the user A and the PoC User A receives an indication that he can start to speak.
7. The PoC Server B sends an INVITE request to the PoC Client B. The INVITE request includes the request for automatic answer mode.
8. The Client B accepts the invitation without prompting the PoC User B.
9. The PoC Server B forwards the 200 OK to the PoC Server A.

The PoC standards define a mechanism for allowing a caller to override a manual answer mode setting specified by a called user. This involves the inclusion of a "MAO" parameter in the SIP INVITE message sent by the calling user to initiate the PoC session. Upon receipt of an INVITE containing the MAO parameter at the called party's terminal, that terminal automatically determines whether manual override is allowed for the calling user. If so, then the 200OK answer is automatically returned to the local PoC server, and the INVITE forwarded to the called user including the MAO parameter. If not, a ringing alert is played, and the answer message only sent out if and when the called user answers.

SUMMARY OF THE INVENTION

The inventor of the present invention has recognised that it is desirable to provide a mechanism in PoC for allowing a calling party to override an auto-answer mode setting at a called party's terminal, in addition to the current mechanism for overriding a manual answer mode setting. This additional feature will be useful, for example, when a calling party wishes his words to be private, and wishes to avoid these being played out on the called party's terminal for all those within earshot to hear. The desire for an override mechanism applies also when a PoC User is invited to an ongoing PoC Session, or when initiating a PoC Session using a preestablished Session.

According to a first aspect of the present invention there is provided a method of operating a push-to-talk service over a mobile wireless communication network, where a user of a mobile wireless terminal may select an automatic or manual answer mode for incoming session invitations for at least some other users, the method comprising:

including in the push-to-talk session invitation sent from a calling party to a called party, a manual answer mode request;

upon receipt of the session invitation at a push-to-talk server serving the called party, forwarding the invitation including the manual answer mode request to the called party regardless of any auto-answer mode setting for the called party; and receiving the invitation at the called party, and generating an alert at the called party's terminal.

Preferably, the signalling protocol used to establish and control push-to-talk sessions is the Session Initiation Protocol. The invitation that contains the manual answer mode request may be the Session Initiation Protocol INVITE or REFER message.

The push-to-talk session invitation may be forwarded by said push-to-talk server to the called party only following an authorisation procedure carried out by the server. The method may also comprise carrying out an authorisation procedure at a push-to-talk server serving the calling party, the request only being included in the invitation forwarded to the push-to-talk server serving the called party if authorisation is granted. Either or both of the authorisation procedures may be carried out by comparing the identity of the calling party and/or called party against a list or lists of identities pre-stored at the push-to-talk server(s).

Preferably, the method includes receiving a user prompt at the calling party to request manual answer mode, and as a result including the request in the invitation at the calling party. Alternatively, inclusion of the request could be automatically carried out, e.g. as a result of pre-setting at the calling party.

The invention is applicable in particular to the push-to-talk over cellular service.

According to a second aspect of the present invention there is provided a method of operating a push-to-talk enabled mobile wireless terminal, the method comprising including a manual answer mode request in an invitation sent by the terminal to a peer terminal According to a third aspect of the present invention there is provided a method of operating a push-to-talk server within a mobile wireless communication network, the method comprising receiving a push-to-talk invitation from a calling client terminal, the invitation including a manual answer mode request, forwarding the request including the manual answer mode request to the called client terminal, and awaiting receipt of an answer message from the called client terminal before proceeding with session establishment.

According to a fourth aspect of the present invention there is provided a mobile wireless terminal having a processor and memory configured to facilitate participation of the terminal in a push-to-talk session facilitated by a mobile wireless communication network, and a user interface for allowing a user to interact with the processor and memory, the processor being arranged to receive a user input from the user interface initiating a push-to-talk session, to generate a push-to-talk invitation for sending to a called terminal and to include in the invitation a manual answer mode request, and to send the invitation to the called terminal.

According to a fifth aspect of the present invention there is provided a push-to-talk server for use in a mobile wireless communication network to provide a push-to-talk service to wireless mobile terminals, the server comprising:

an input for receiving a push-to-talk invitation from a first wireless mobile terminal destined for a second wireless mobile terminal, where the invitation may include a manual answer mode request;

an output for forwarding a received push-to-talk invitation to a second, destination wireless mobile terminal; and a processor programmed to determine whether or not a received invitation includes a manual answer mode request and, if so and if an automatic answer mode has been set for the second wireless mobile terminal, overriding the automatic mode setting and forwarding the invitation to the second wireless terminal including the manual answer mode request via said output.

DETAILED DESCRIPTION OF CERTAIN EMBODIMENTS

Figure 1:
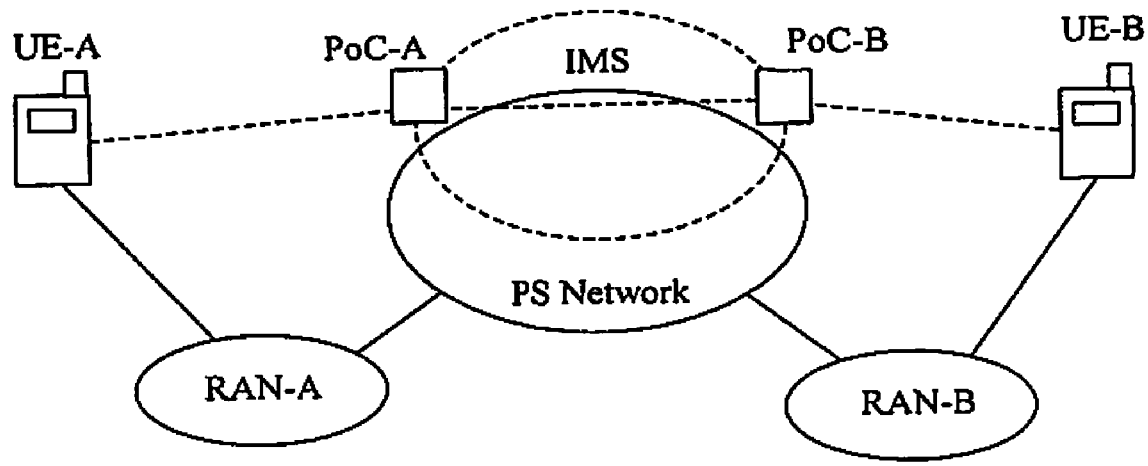
FIG. 1 illustrates schematically a mobile wireless communication network facilitating a Push-to-Talk over Cellular service.
Figure 2:
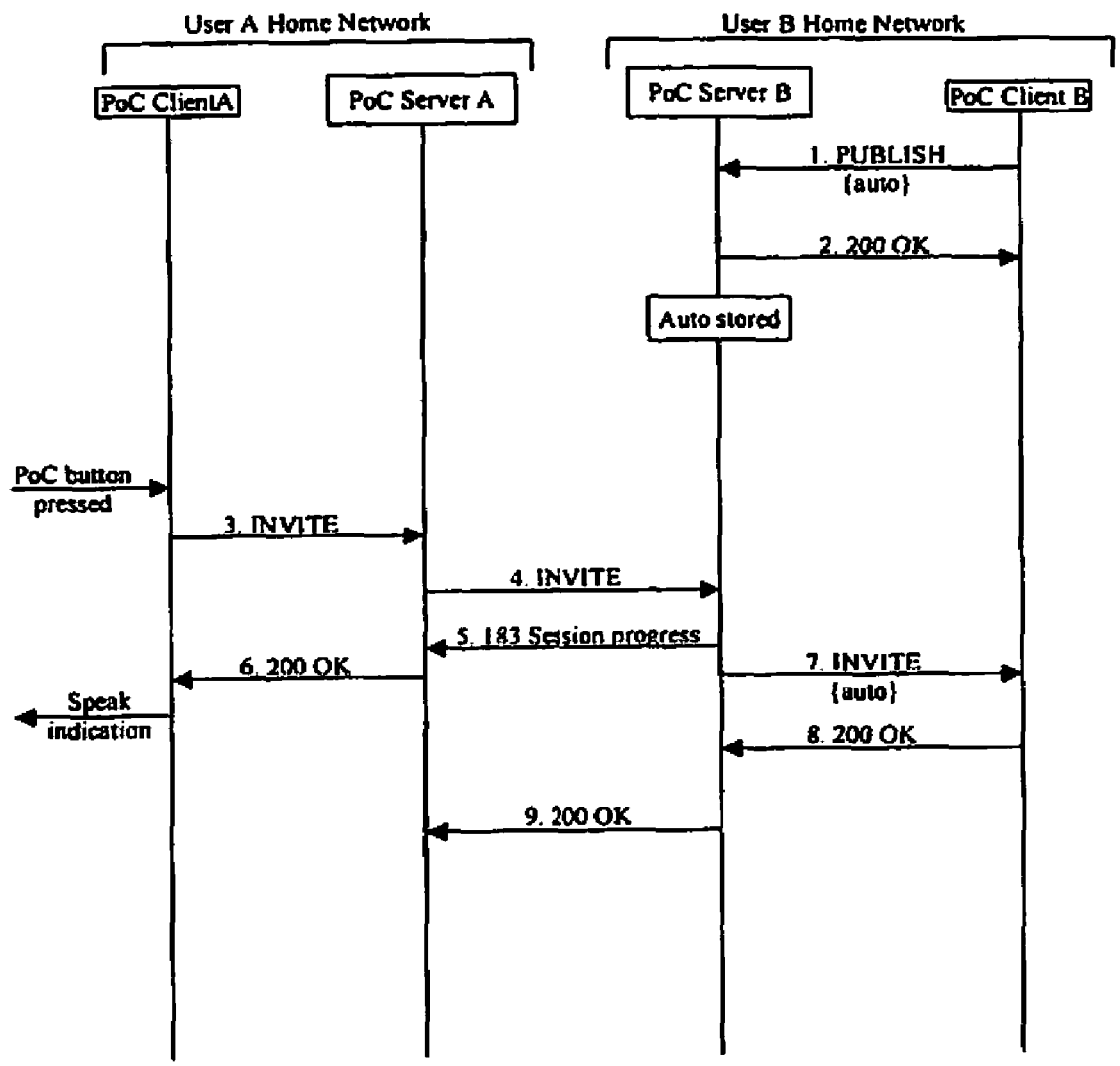
FIG. 2 illustrates signalling in the network of FIG. 1 associated with session establishment in the auto-answer mode.

The push-to talk over cellular (PoC) service has been described above with reference to FIG. 1, and the manual answer mode override discussed with reference to FIG. 2. The following discussion proposes the introduction of a further override feature, namely an auto-answer mode override feature, the need for which has not previously been recognised. The person of skill in the art will appreciate that the widespread use of this new feature may require amendments of and/or extensions to the PoC specifications.

Figure 3:
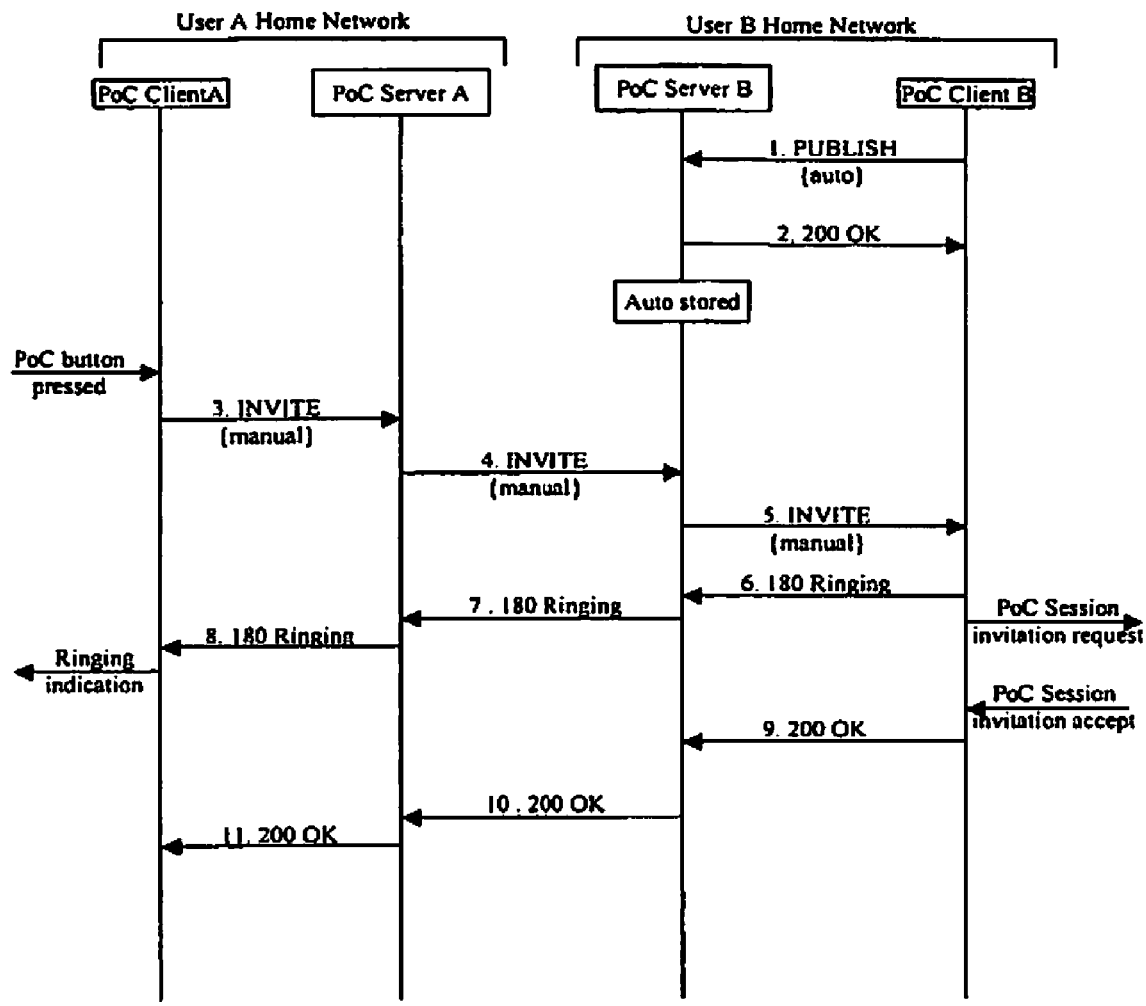
FIG. 3 illustrates signalling in the network of FIG. 1 associated an auto-answer mode override procedure during session establishment.

When a first PoC user (User A) wants to communicate with a second PoC user (User B) using the manual answer mode, e.g. when User A does not want to speak before User B is in a position where no other person can overhear the conversation, User A can include in the invitation sent to User B a request that manual answer mode be used, overriding any auto-answer mode that User B may have put in place. FIG. 3 shows a simplified signalling flow example when a PoC User A invites another PoC User B to a PoC Session and includes in the invitation a manual answer mode request. This request has the form of the existing manual answer mode request provided for in the PoC specifications (but currently intended for addition to the invitation only at the local PoC server of User A).

The answer mode is configured as follows:

1. The PoC Client B configures automatic mode in the network by means of a PUBLISH request.
2. The PoC Server B acknowledges the automatic answer mode setting by means of a 200 "OK" response and stores the "auto" setting.

When the PoC User A presses the PoC button on his terminal, the steps are as follows:

3. The PoC Client A decides to invite PoC User B to a PoC Session and sends an INVITE request to the PoC Server A. The manual answer mode is included in the INVITE request at Client A.
4. The PoC Server A sends the INVITE request to the PoC Server B in the PoC User B Home Network. The manual answer mode is included in the INVITE request.
5. The PoC Server B sends an INVITE request to the PoC Client B. The INVITE request includes the request for manual answer mode received in the INVITE request from PoC Server A. The inclusion of the manual answer mode indication instead of the configured answer mode may be subject to authorisation at PoC server B, i.e. to determine whether or not User B has authorised auto-answer mode override by User A.
6. The PoC Client B sends a 180 Ringing response to the PoC Server B and indicates to the PoC User B that a PoC Session invitation has been received.
7. The PoC Server B sends the 180 "Ringing" response to PoC Server A.
8. The PoC Server A sends the 180 "Ringing" response to the PoC Client A. The PoC Client A indicates to the PoC User A that the PoC User B is being informed about the invitation and that the PoC Client B is waiting for PoC User B's acceptance, e.g. a ringing tone is played at Client B.
9. When User B accepts the invitation, the PoC Client B sends an INVITE request to PoC Server B.
10. The PoC Server B forwards the 200 OK to the PoC Server A.
11. The PoC Server A sends a 200 OK response to the user A and the PoC User A receives an indication that he can start to speak. The PoC session is established.

It will be readily appreciated that the procedure described here enables the calling client, PoC Client A, to influence the decision taken by the PoC Server B regarding the answer mode for Client B.

The procedure described here is equally applicable to a scenario in which a PoC User is invited to participate in an ongoing PoC Session, and in which a PoC Session is initiated using a preestablished session. In the latter case, the only significant difference to the approach described above is that the manual answer mode request is included in the REFER request sent by the PoC Client inviting the PoC User, rather than in the INVITE message.

It will be appreciated by the person of skill in the art that various modifications may be made to the above described embodiments without departing from the scope of the present invention.

The invention claimed is:

1. A method of operating a push-to-talk service over a mobile wireless communication network, where a user of a mobile wireless terminal may select an automatic or manual answer mode for incoming session invitations for at least some other users, the method comprising the steps of:
   including in a push-to-talk session invitation sent from a calling party to a called party, a manual answer mode request requesting said called party to answer an incoming session in said manual answer mode;
   upon receipt of the session invitation at a push-to-talk server serving the called party,
      determining at said push-to-talk server that said manual answer mode request is included in said push-to-talk session invitation and forwarding the session invitation including the manual answer mode request to the called party regardless of any auto-answer mode selling for the called party stored within said server; and
   receiving the session invitation at the called party, and generating an alert at the called party's terminal.

2. A method according to claim 1, wherein the push-to-talk sessions uses Session Initiation Protocol as signaling protocol, and the invitation that contains the manual answer mode request is one of Session Initiation Protocol INVITE or REFER messages.

3. A method according to claim 1, wherein the push-to-talk session invitation is forwarded by said push-to-talk server to the called party only following an authorisation procedure carried out by the server.

4. A method according to claim 3, wherein the authorisation procedure is carried out by comparing the identity of the calling party or the called party against a list of identities pre-stored at the push-to-talk server.

5. A method according to claim 1 further comprising the step of carrying out an authorisation procedure at a push-to-talk server serving the calling party, the request only being included in the invitation forwarded to the push-to-talk server serving the called party if said authorisation is granted.

6. A method according to claim 1 further comprising the step of receiving a user prompt at the calling party to request said manual answer mode, and as a result including the request in the invitation at the calling party.

7. A method according to claim 1 further comprising the step of including said request at the calling party automatically.

8. A method according to claim 1, wherein said push-to-talk service is a push-to-talk over cellular service.

9. A method of operating a push-to-talk server within a mobile wireless communication network, the method comprising the steps of:
   receiving a push-to-talk invitation from a calling client terminal, the invitation including a manual answer mode request requesting a called party to answer in said manual answer mode,
   forwarding an incoming session request including the manual answer mode request from said push-to-talk server to a specified called client terminal regardless of any auto-answer mode setting for the called client terminal, and
   awaiting receipt of an answer message from the called client terminal in response to said called client terminal being alerted of said incoming session request before proceeding with session establishment.

10. The method of claim 9 wherein said push-to-talk invitation comprises a Session Initiation Protocol and wherein said invitation including said manual answer mode request is a Protocol INVITE or REFER message.

11. A push-to-talk server for use in a mobile wireless communication network to provide a push-to-talk service to wireless mobile terminals, the server comprising:
   an input for receiving a push-to-talk invitation from a first wireless mobile terminal destined for a second wireless mobile terminal, where the invitation may include a manual answer mode request requesting said second wireless mobile terminal to answer said invitation in a manual answer mode;
   an output for forwarding a received push-to-talk invitation to said second, destination wireless mobile terminal; and
   a processor programmed to determine whether or not said received invitation includes said manual answer mode request and, if so and if an automatic answer mode has been set for the second wireless mobile terminal, overriding the automatic mode setting and forwarding the invitation to the second wireless terminal including the manual answer mode request via said output.

12. The push-to-talk server of claim 11 wherein said push-to-talk invitation comprises a Session Initiation Protocol and wherein said invitation including said manual answer mode request is a Protocol INVITE or REFER message.

13. The push-to-talk server of claim 11 wherein said output for forwarding said received push-to-talk invitation is performed after an authorization procedure by comparing said first wireless mobile terminal or second wireless mobile terminal against a list of identities pre-stored at said push-to-talk server.

* * * * *